US009402508B2

(12) United States Patent
Cothern

(10) Patent No.: US 9,402,508 B2
(45) Date of Patent: Aug. 2, 2016

(54) PIVOTAL SUPPORT FRAME AND TRANSPORT DEVICE FOR CERAMIC COOKERS, GRILLS, AND SMOKERS

(71) Applicant: Terry D. Cothern, Boston, KY (US)

(72) Inventor: Terry D. Cothern, Boston, KY (US)

(*) Notice: Subject to any disclaimer, the term of this patent is extended or adjusted under 35 U.S.C. 154(b) by 0 days.

(21) Appl. No.: 14/120,987

(22) Filed: Jul. 18, 2014

(65) Prior Publication Data

US 2015/0021448 A1 Jan. 22, 2015

Related U.S. Application Data

(60) Provisional application No. 61/958,039, filed on Jul. 18, 2013.

(51) Int. Cl.
*A47J 37/07* (2006.01)
*A47J 36/34* (2006.01)
*F16M 3/00* (2006.01)
*B62B 5/00* (2006.01)
*B62B 3/08* (2006.01)
*B62B 3/10* (2006.01)

(52) U.S. Cl.
CPC *A47J 37/07* (2013.01); *A47J 36/34* (2013.01); *A47J 37/0763* (2013.01); *B62B 3/08* (2013.01); *B62B 3/104* (2013.01); *B62B 5/0003* (2013.01); *F16M 3/00* (2013.01); *A47J 2037/0777* (2013.01); *B62B 2203/04* (2013.01); *B62B 2203/07* (2013.01)

(58) Field of Classification Search
CPC ............ A47J 37/0763; A47J 2037/0777; A47J 37/07; B62B 5/0003; B62B 3/08; B62B 3/104; B62B 2203/04; B62B 2203/07
See application file for complete search history.

(56) References Cited

U.S. PATENT DOCUMENTS

| 1,937,668 | A | * | 12/1933 | Pine | 248/129 |
|---|---|---|---|---|---|
| 2,360,799 | A | | 10/1944 | Slingsby | |
| 2,780,474 | A | | 2/1957 | Farah | |
| 2,893,578 | A | * | 7/1959 | Paul | 414/451 |
| 2,900,897 | A | | 8/1959 | Fisher | |
| 3,052,441 | A | * | 9/1962 | Fleischman | 248/141 |
| 3,147,748 | A | | 9/1964 | Frank | |
| 3,874,531 | A | * | 4/1975 | Mayo | 414/680 |

(Continued)

FOREIGN PATENT DOCUMENTS

| DE | 29718383 U1 * | 3/1998 | |
| DE | 202012004943 U1 * | 7/2012 | B62B 1/12 |

(Continued)

*Primary Examiner* — Terrell McKinnon
*Assistant Examiner* — Eret McNichols
(74) *Attorney, Agent, or Firm* — Carrithers Law Office, PLLC

(57) ABSTRACT

A ceramic cooker support frame and transport device for holding, loading and unloading a ceramic cooker, smoker, or grill having a egg, cylindrical or spherical shape which includes a cooker holding pivotal frame with a freely swinging cooker basket and a detachable hand truck in order to maintain the cooker in an upright position during the loading and storage positions. The hand truck includes a frame with wheels and a locking handle to maintain the desired spacing between the support surface and the cooker supported by the elevated platform. The truck or dolly frame and locking handle are detachable from the cooker holding frame. The cooker frame and hand truck assembly are configured to be easily moved onto an elevated platform, for example, the bed of a truck or an elevated floor such as a raised patio or deck floor. The transport device facilitates cooking food for transport to a serving area.

20 Claims, 12 Drawing Sheets

(56) References Cited

U.S. PATENT DOCUMENTS

| | | | |
|---|---|---|---|
| 4,200,085 A | 4/1980 | Buehl | |
| 4,614,350 A * | 9/1986 | Bunch | 280/47.24 |
| 5,307,789 A | 5/1994 | Newby | |
| 5,318,322 A | 6/1994 | Home | |
| 5,503,424 A * | 4/1996 | Agopian | 280/651 |
| 5,846,043 A * | 12/1998 | Spath | 414/343 |
| 5,857,403 A | 1/1999 | Mann | |
| 6,082,248 A | 7/2000 | Turrel | |
| 6,105,488 A | 8/2000 | King | |
| 6,220,240 B1 | 4/2001 | Grady | |
| 6,543,435 B1 | 4/2003 | Regen | |
| 6,561,183 B1 | 5/2003 | Spilde | |
| 6,720,532 B1 | 4/2004 | Mann | |
| 7,140,362 B1 | 11/2006 | Johnston | |
| 7,263,991 B2 | 9/2007 | Schlosser | |
| 7,278,645 B1 * | 10/2007 | Davis | B62B 1/08 280/47.28 |
| 7,458,809 B2 | 12/2008 | Hohenshelt | |
| 7,780,439 B2 | 8/2010 | Alipour | |
| 8,789,801 B2 * | 7/2014 | Newman | B62B 1/24 248/130 |
| 2009/0232633 A1 * | 9/2009 | Stamps et al. | 414/814 |
| 2011/0052357 A1 * | 3/2011 | Torrison | 414/495 |
| 2012/0145978 A1 * | 6/2012 | Rich et al. | 254/2 R |
| 2012/0193894 A1 * | 8/2012 | Fine | 280/651 |
| 2012/0273537 A1 * | 11/2012 | Newman | B62B 1/24 224/406 |
| 2012/0286484 A1 * | 11/2012 | Gonzalez | 280/30 |
| 2012/0292868 A1 * | 11/2012 | Goellner | 280/47.19 |
| 2013/0221631 A1 * | 8/2013 | Smith et al. | 280/79.7 |
| 2013/0312732 A1 | 11/2013 | Brennan | |
| 2014/0041298 A1 * | 2/2014 | Mack | 47/66.6 |
| 2014/0053823 A1 | 2/2014 | Frantz | |
| 2015/0097358 A1 * | 4/2015 | Lee | 280/651 |

FOREIGN PATENT DOCUMENTS

| | | | | |
|---|---|---|---|---|
| FR | 1163179 | * | 9/1958 | |
| GB | 781134 A | * | 8/1957 | |
| GB | 2427174 A | * | 12/2006 | B62B 1/14 |
| GB | 2494106 A | * | 3/2013 | B62B 1/16 |

* cited by examiner

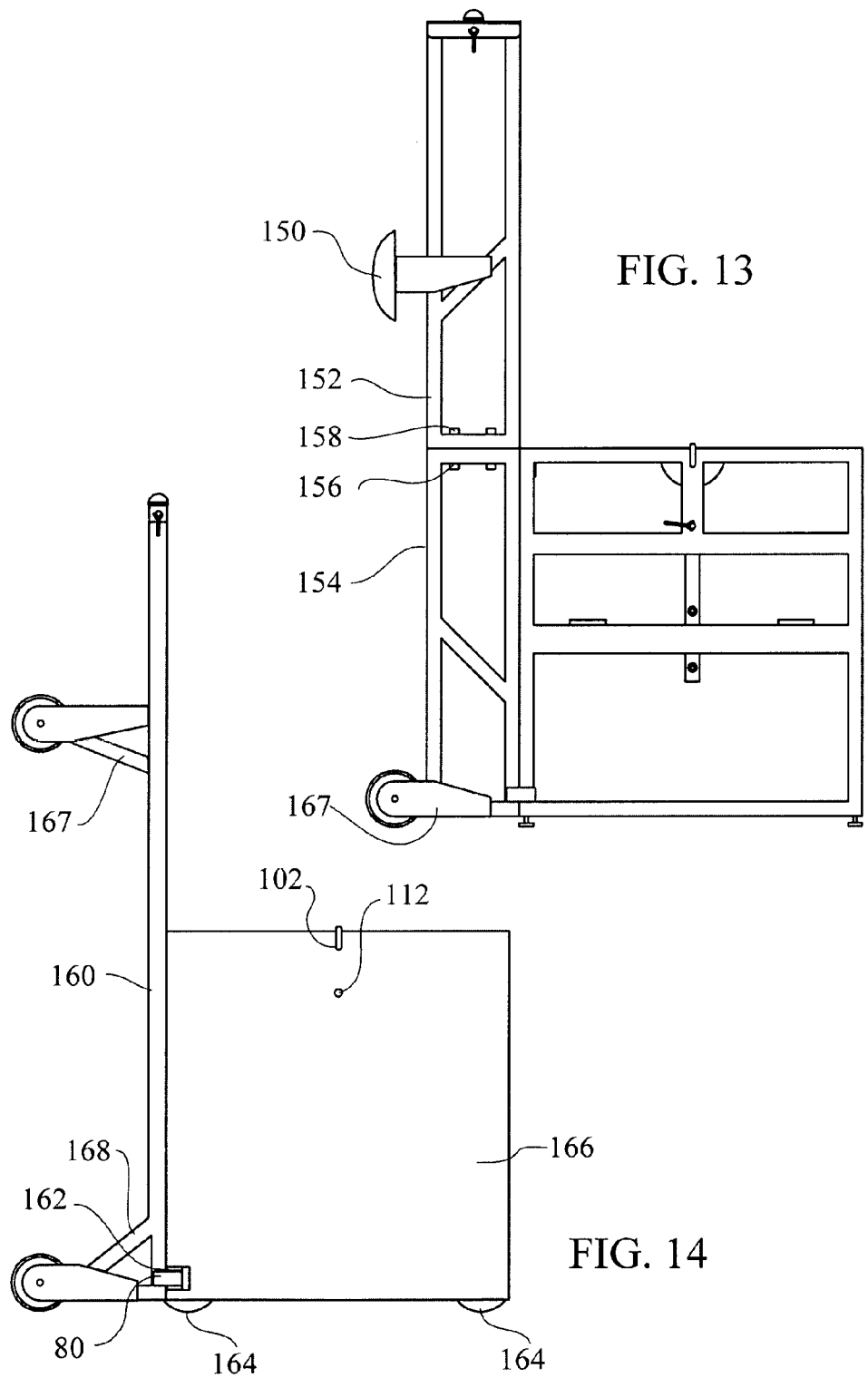

PIVOTAL SUPPORT FRAME AND TRANSPORT DEVICE FOR CERAMIC COOKERS, GRILLS, AND SMOKERS

CROSS REFERENCES TO RELATED APPLICATIONS

This application claims priority to U.S. Provisional Application 61/958,039 filed on Jul. 18, 2013 which is incorporated herein in its entirety.

TECHNICAL FIELD

The present invention relates to a pivotal support frame and transport device for outdoor cooking devices such as ceramic cookers, smokers, and grills which may have a cylindrical, spherical or egg-shaped body. The cooker support frame and transport device provides for easy movement of the cooker and easy loading of the cooker into a pickup truck or other vehicle, or onto raised surfaces such as a raised outdoor deck while.

BACKGROUND OF THE INVENTION

Cylindrical and spherical shaped grills and smokers have traditionally been supported by a plurality of legs or a rigid square or rectangular frame.

Conventional grill support assemblies include U.S. Pat. No. 6,561,183 for a FLUID HEATER SYSTEM WITH TILT ABLE HEATER ASSEMBLY by Spilde et al. teaches a cart with a tillable heater assembly. U.S. Pat. No. 7,458,809 for a PORTABLE KILN by Hohenshelt et al. teaches a kiln with support feet and an attached hand truck. U.S. Patent Application No. 20130312732 for a GAS AND CERAMIC GRILL COMBINATION by Brennan teaches a portable frame which removably holds a Komada grill.

Ceramic "egg-shaped" cookers for outdoor cooking have become a popular alternative to ordinary barbeque grills. Ceramic cookers are similar in design to the kamado barbecue which originated in southern Japan. The mushikamado (Japanese for "steam cooker" from "mushi" meaning "to steam", and "kamado" meaning "cooker, oven, or kiln") was a device designed to steam rice and used by Japanese families for ceremonial occasions. The mushikamado took the shape of a round clay pot with a removable domed clay lid and featured a top damper and bottom draft door. The mushikamado first came to the attention of the Americans after World War II when US Air Force servicemen would bring them back from Japan in empty transport planes.

The "egg" like shape of the ceramic cookers reflect ancient technology and is designed to contain and control the heat with only a small vent at the top to create a draft to keep the fire going. Modern "egg-shaped" ceramic cookers are manufactured from high fiber ceramics developed for the space shuttle program specifically designed to reflect heat allowing a temperatures of up to 650° C., (1200° F.). The external surface has a high gloss ceramic glaze applied to provide crack and weather resistance. Consequently, the "egg-shaped" ceramic cooker is quite heavy. The "egg-shaped" ceramic cooker varies in size and weight from 39 pounds to about 220 pounds and therefore are difficult to move.

Ceramic cookers like ones discussed above are typically quite heavy and cumbersome or dangerous to move especially while in use or hot. Small frames are available which can hold the cooker upright on a stable flat surface, however, these frames are not easily portable, especially when the cooker is in the frame and more especially when the cooker is in use.

SUMMARY OF THE INVENTION

A ceramic cooker support frame and transport device for holding, loading and unloading a ceramic cooker, smoker, or grill having a "egg-shaped" ceramic cooker, cylindrical or spherical shape which includes a cooker holding pivotal frame with a freely swinging cooker basket and a detachable hand truck in order to maintain the cooker in an upright position during the loading and storage positions. The hand truck includes a frame with wheels and a locking handle to maintain the desired spacing between the support surface and the cooker supported by the elevated platform. The truck or dolly frame and locking handle are detachable from the cooker holding frame. The cooker frame and hand truck assembly are configured to be easily moved onto an elevated platform, for example, the bed of a truck or an elevated floor such as a raised patio or deck floor. The transport device facilitates cooking food for transport to a serving area.

The ceramic cooker support frame and transport device includes a pivotal cooker holding frame with a freely swinging cooker basket and a detachable hand truck or dolly. The hand truck has a frame comprising longitudinal members forming a generally rectangular frame defining a pair of legs with wheels and a locking handle to maintain the desired distance between the surface of an elevated platform onto which the cooker is to be loaded. The leg frames and locking handle are detachable from the cooker holding frame. The cooker frame and hand truck assembly is configured to be easily moved onto an elevated platform, for example, the bed of a truck or an elevated floor such as a raised patio or deck floor.

The spacing of the wheels on the rail and positioning of the pivot point of the grill upon the frame are novel features which facilitate loading and unloading of the grill and frame onto the bed of a pickup truck or trailer permitting pivotal movement of the grill during loading allowing the grill to remain in an upright position throughout the loading process.

In accordance with this invention, there is provided a ceramic cooker support frame and transport device for holding in an upright position, a ceramic smoker. The device includes a self leveling basket, a rigid frame, and a hand truck including two detachable leg frames with wheels and a handle which holds the leg frames together. The leg frames can be attached when a user desires to move the cooker and can be removed when not moving, loading or unloading the cooker.

More particularly, the pivotal support frame and transport device for a cooker, grill, or smoker, comprises a detachable hand truck removably connecting to a cooker holding frame supporting a weighted pivotal basket therein for holding a hot cooker. The hand truck comprises first and second spaced apart, aligned, and parallel side frames, each one including at least one bottom wheel extending from the frame horizontal to the ground and a support base member spaced apart from and in alignment with the at least one bottom wheel for contacting an elevated surface when the hand truck is positioned at an angle with respect to the ground and the elevated surface. A cross member connecting the first side frame to the second side frame defines a handle there between. Means including flanges or brackets removably attach a front surface of the first side frame and the second side frame to a cooker holding frame. A cooker holding frame comprises a generally square structural frame including a vertical right side frame and a vertical left side frame connected parallel to one another and spaced apart by at least one horizontal connecting bar. The right side frame and the left side frame having an open perimeter, and a pivotal basket for holding and supporting a cooker therein. The pivotal basket includes a basket frame extending around the cooker for holding same. The basket frame pivotally mounts within the cooker holding frame. The basket includes a weighted member extending from a lower end of the basket. The basket frame includes a plurality of holding means such as brackets extending therefrom inwardly at selected positions for holding the cooker securely there between. The weighted member pivots the pivotal basket holding it in an up-right position with respect to the cooker frame when the cooker frame is connected to the hand truck and tilted at an angle for loading or unloading from an elevated surface.

The cooker support frame and transport device comprises a cooker holding frame having right side frame connecting to an opposing left side frame by at least one rear longitudinal member and at least one front longitudinal frame member. The cooker holding frame includes holding frame means for pivotally mounting of a self leveling cooker holding basket assembly supported by the right side frame and the left side frame. The cooker holding basket assembly comprises a peripheral basket frame for surrounding a cooker. The peripheral basket frame includes pivotal connections for cooperatively engaging the holding frame means for mounting. A basket base supports a cooker thereon. The basket base hangs from at least two basket support members extending downward from the peripheral basket frame. The peripheral basket frame includes a counterweight mounting to the basket base and a plurality of brackets extending inwardly from the peripheral basket frame for holding the cooker spaced apart from the peripheral basket frame. The dolly is in cooperative engagement and removably attachable to the cooker holding frame. The dolly comprises a left longitudinal dolly frame member and a right longitudinal dolly frame member spaced apart from and in alignment and parallel with one another. The left longitudinal dolly frame member and the right longitudinal dolly frame member include a bottom rear roller mounting means with a bottom roller extending outwardly therefrom. The left longitudinal dolly frame member and the right longitudinal dolly frame member include a medial rear roller mounting means with a medial roller extending outwardly therefrom. The left medial holding means removably attaches a front medial edge of the left longitudinal dolly frame member with a rear medial edge of the left side frame. A right medial holding means removably attaches a front medial edge of the right longitudinal dolly frame member with a rear medial edge of the right side frame. A left bottom holding means removably attaches a front bottom edge of the left longitudinal dolly frame member with a rear bottom edge of the left side frame. A right bottom holding means removably attaches a front bottom edge of the right longitudinal dolly frame member with a rear bottom edge of the right side frame. A handle comprises a horizontal bar extending between the left longitudinal dolly frame member and the right longitudinal dolly frame member.

It is an object of the present invention to provide a ceramic cooker support frame and transport device which enables a user to use, move, and single handedly load a ceramic cooker onto an elevated platform such as a truck bed, while maintaining the ceramic cooker in an upright position in a locking self leveling basket with a counter weight while the device is tilted, moved, and loaded or unloaded without need to disassemble the cooker.

It is also an object of the present invention to provide a ceramic cooker support frame and transport device for loading and unloading a ceramic cooker by means of two detachable leg frames with wheels and a locking handle, configured to maintain the desired distance between the ceramic cooker and the surface of an elevated platform onto which the cooker is to be loaded. The top wheels of the leg frames extend outward above the elevated platform when the transport device is brought in proximity with the platform so that the top wheels are tilted onto and rolled onto the elevated platform while the rest of the transport device with the cooker are raised up so that the bottom wheels are then rolled onto the elevated platform.

It is an object of the present invention to provide a ceramic cooker support frame and transport device which includes a cooker holding frame which has a cooker self leveling feature allowing the cooker to pivot on an axis during transport.

It is an object of the present invention to provide a ceramic cooker support frame and transport device wherein the ceramic cooker holding frame can permanently hold and support the ceramic cooker or the ceramic cooker can be removed as desired.

It is an object of this invention to provide a ceramic cooker support frame and transport device wherein the removable leg frames includes at least two wheels on each leg frame mounted on the side and facing away from the attached ceramic cooker support frame, one wheel near the bottom of the leg frame and one near the top of the leg frame, for enabling tipping of the support frame into the bed of a vehicle such as a pickup or flat bed truck.

It is an object of the present invention to provide a truck frame having at least two wheels on the bottom portion to support the frame for movement and either wheels or other rotatable or slidable base support means on the top portion of the truck frame for supporting the truck frame in a level manner on an elevated position.

It is an object of the present invention to provide a cooker holding means comprising a cooker holding frame or cage having adjustable brackets extending inwardly toward the cooker having a shape for cooperatively engaging the outer surface of the cooker wherein the brackets can be adjusted or inserted to accommodate cookers of various sizes or shapes and securing same within the pivotal frame or cage.

It is an object of the present invention to provide a truck frame having the bottom wheels spaced at or near the bottom of the frame and the top base support means or wheels spaced a selected distance from the bottom wheels to facilitate loading onto an elevated structure such as a trailer or pickup truck bed whereby the top base support or wheels will rest on the elevated surface supporting the frame while the bottom wheels are on the ground.

It is another object of one embodiment of the present invention to spaced the top truck frame wheels from the bottom truck frame wheels a distance which allows the top wheels to rest on the elevated surface, the bottom wheels to rest on the ground, and the frame of the truck to rest on the edge of the elevated surface when the frame is tilted at an angle while loading onto the elevated surface.

It is an object of the present invention to provide a pivotal transport frame which allows the cooker to be held within the frame and loaded onto and unloaded from an elevated surface while the cooker basket within the cooker frame or cage remains in the horizontal level position to avoid spilling or dumping the cooker contents.

It is an object of the present invention to provide a ceramic cooker support frame and transport device whereby the ceramic cooker can be moved while the ceramic cooker is hot and maintained in an upright position while loading onto an elevated surface.

It is an object of the present invention to provide a ceramic cooker support frame and transport device whereby the ceramic cooker can be moved while the ceramic cooker is hot without having to contact or touch the hot surface of the cooker.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present, invention will be had upon reference to the following description in conjunction with the accompanying drawings in which like numerals refer to like parts throughout the views wherein:

FIG. 13 shows an alternate embodiment of the truck having slidable top support means and a cooker support assembly with feet to support the base; and FIG. 14 shows another alternate embodiment of the truck having a pair of spaced apart aligned longitudinal members having cross members there between forming a flat frame.

DESCRIPTION OF THE PREFERRED EMBODIMENTS

In accordance with the present invention, there is provided a pivotal support frame and transporter 10 for holding and transporting a hot cooker, grill, or smoker, hereafter referenced as a cooker.

Figure 1:
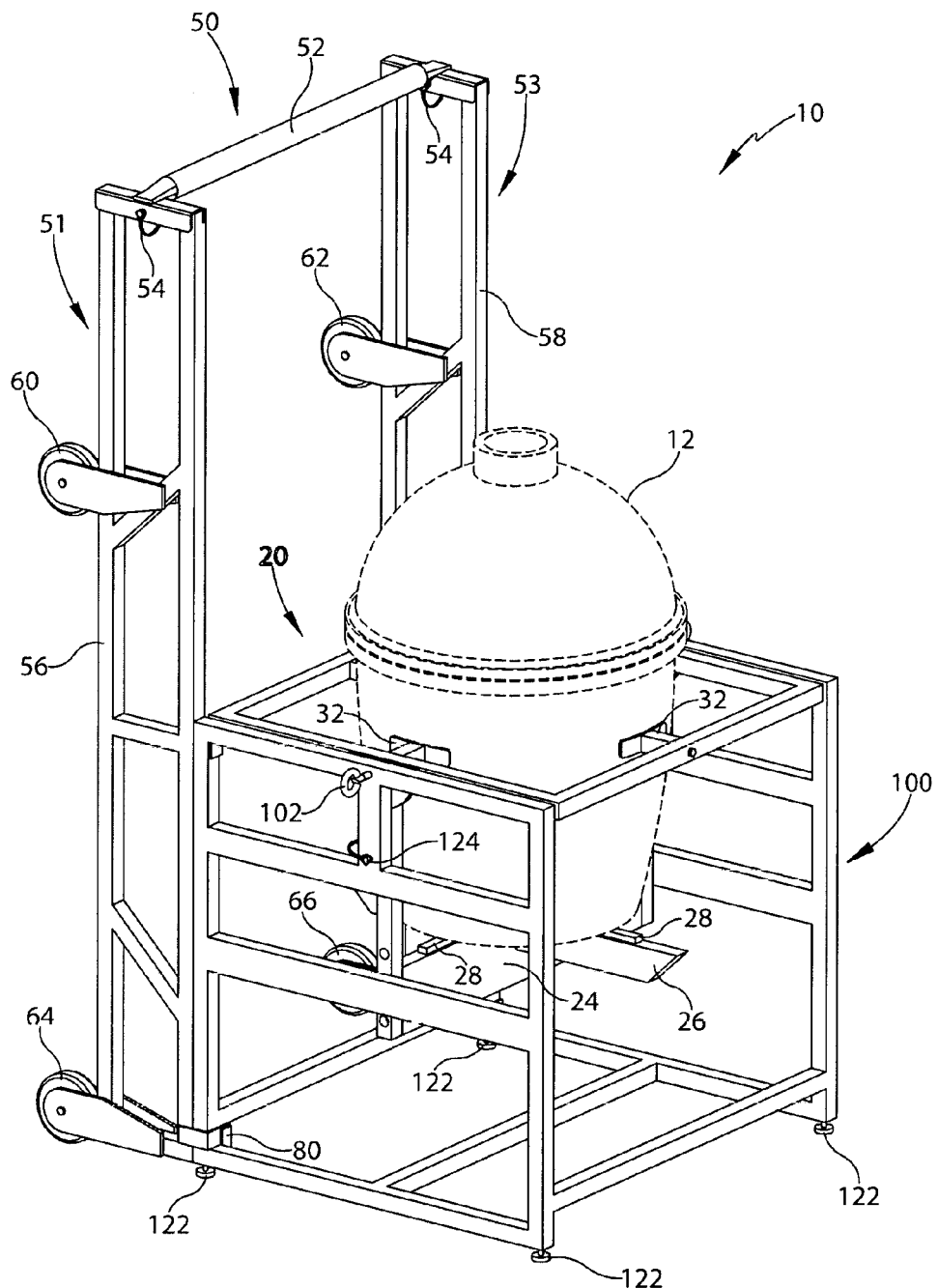
FIG. 1 is a right front view of the ceramic cooker support frame and transporter with the ceramic cooker drawn in phantom lines.
Figure 2:
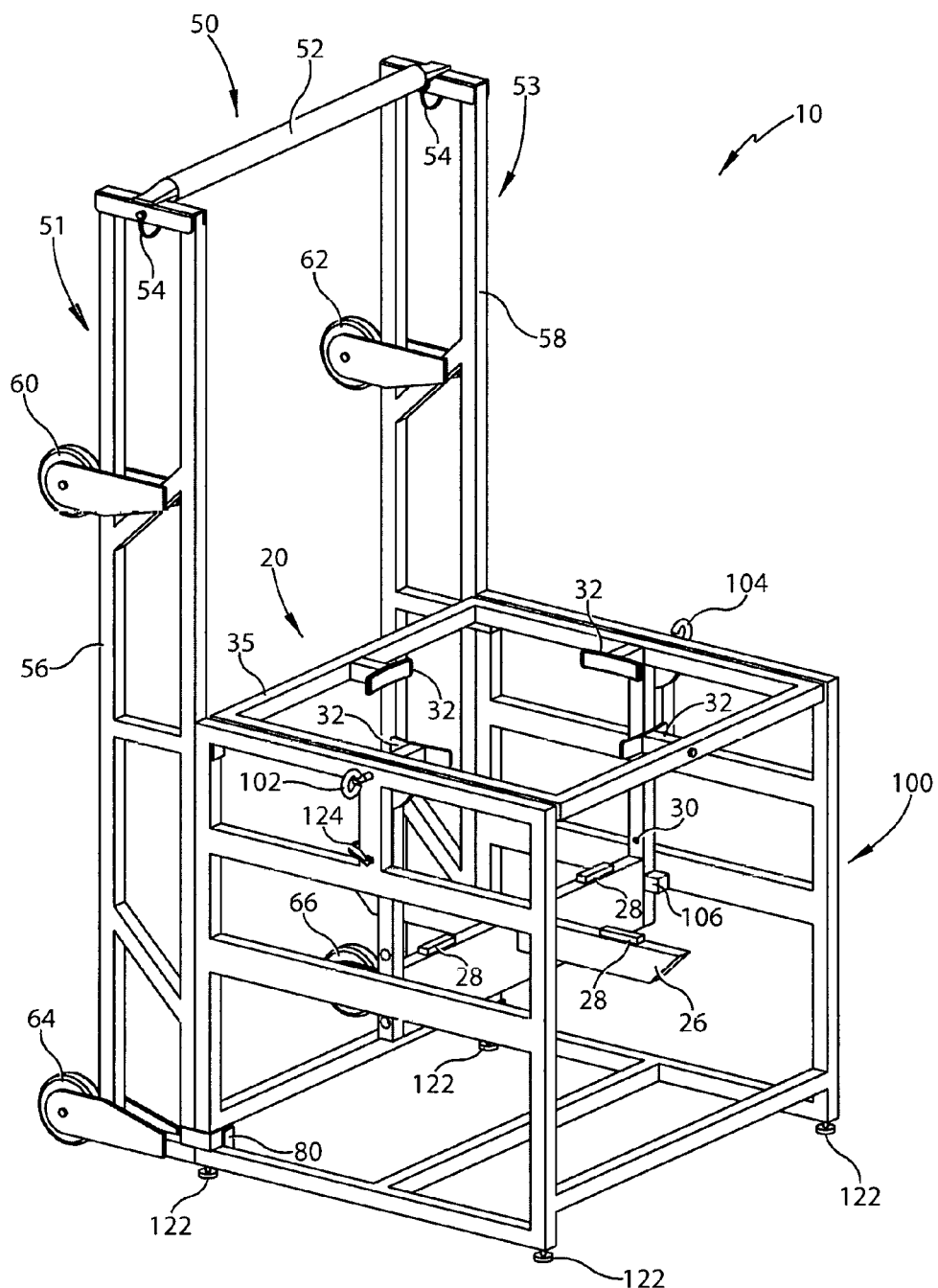
FIG. 2 is a right front view of the ceramic cooker support frame and transporter including the ceramic cooker holding frame and the hand truck.
Figure 3:
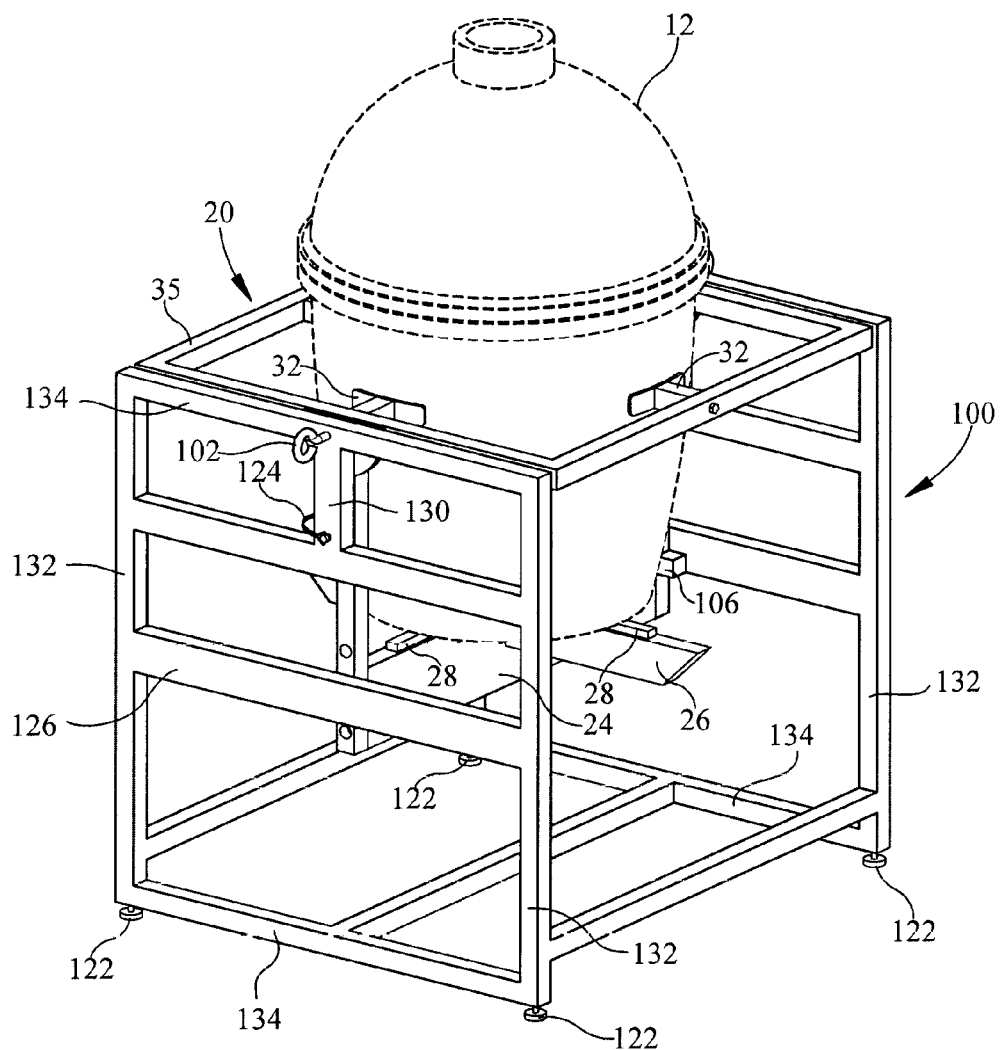
FIG. 3 is a right front view of the ceramic cooker support frame with the ceramic cooker drawn in phantom lines.
Figure 4:
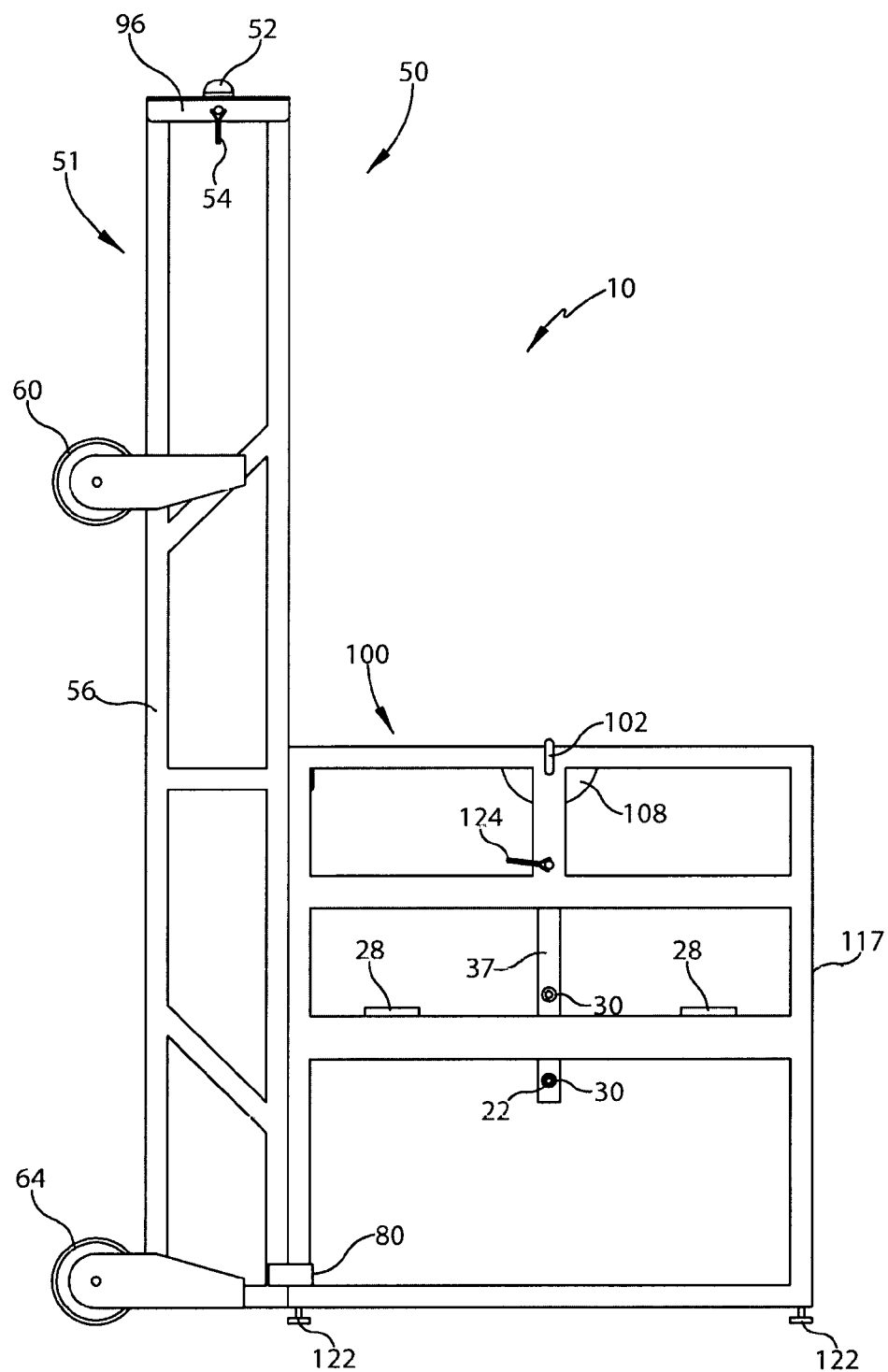
FIG. 4 is a right side view of the ceramic cooker support frame and transporter drawn in the upright position.
Figure 5:
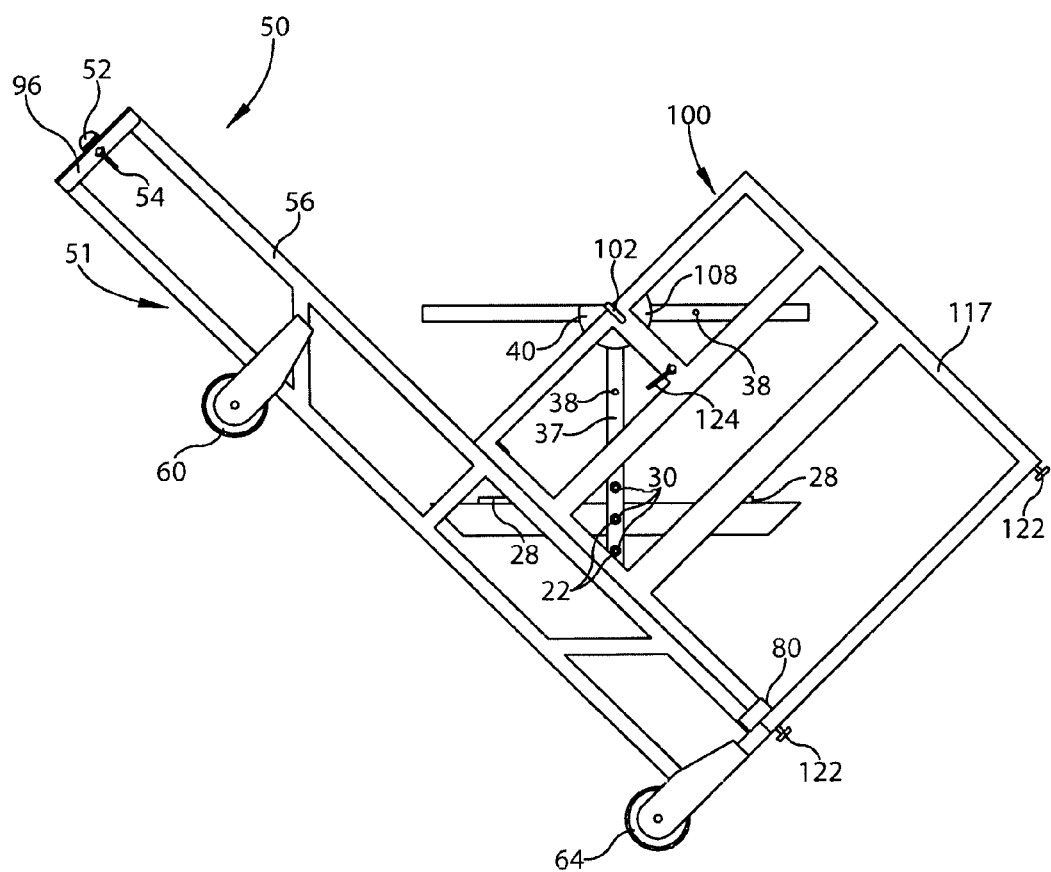
FIG. 5 is a right side view of the ceramic cooker support frame and transporter drawn in the tilted, 'transport' position and shows the self leveling device in operation.
Figure 6:
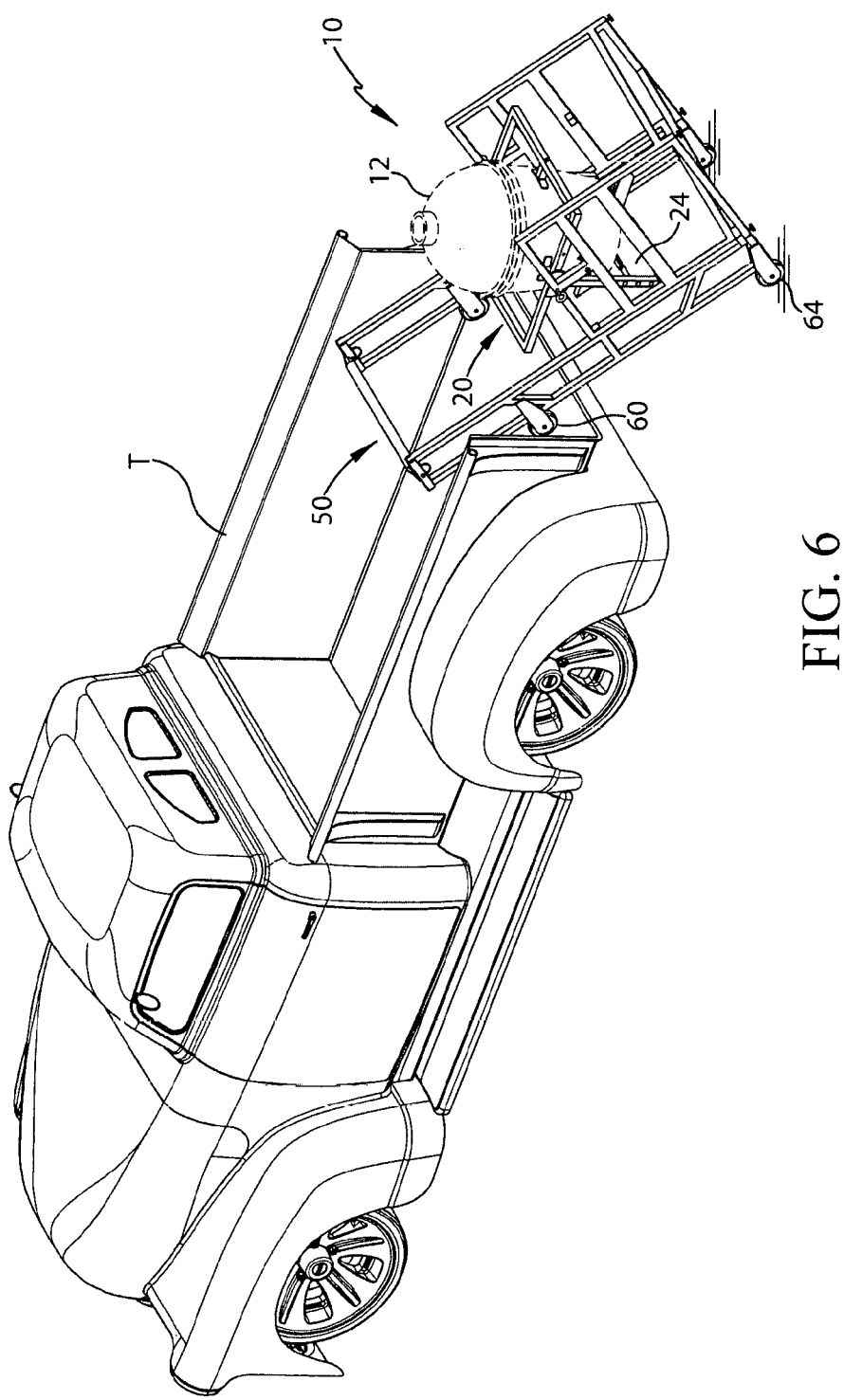
FIG. 6 is a right front view of the ceramic cooker support frame and transporter being loaded into the elevated bed of a pickup truck.

In the following description of the preferred embodiments, the terms 'left' and 'right' are taken with respect to an individual standing on the side of hand truck 50 which is opposite to the side on which the cooker holding frame 100 is connected to the hand truck. Therefore, as seen in FIG. 1, leg frame 58 is on the left and leg frame 56 is on the right. The 'front' side of the cooker holding frame 100 is the side facing away from the hand truck 50.

Shown in FIGS. 1-14, the cooker support frame and transporter 10 includes a cooker holding frame or cage 100 with a pivotally connected cooker holding basket 20 and detachable hand truck or dolly 50.

The hand truck 50 includes two separate generally rectangular side truck frames 51 comprised on longitudinal members and braces and 53 which co-operatively engage at least one longitudinal member disposed there between at a selected location, preferably at the top portion of the frames 51 defining a detachable locking handle 52 which secures the two truck frames together. The bottom of the frames 51 removably attach to the cooker frame which provides structural support to the truck frame as well.

Figure 8:
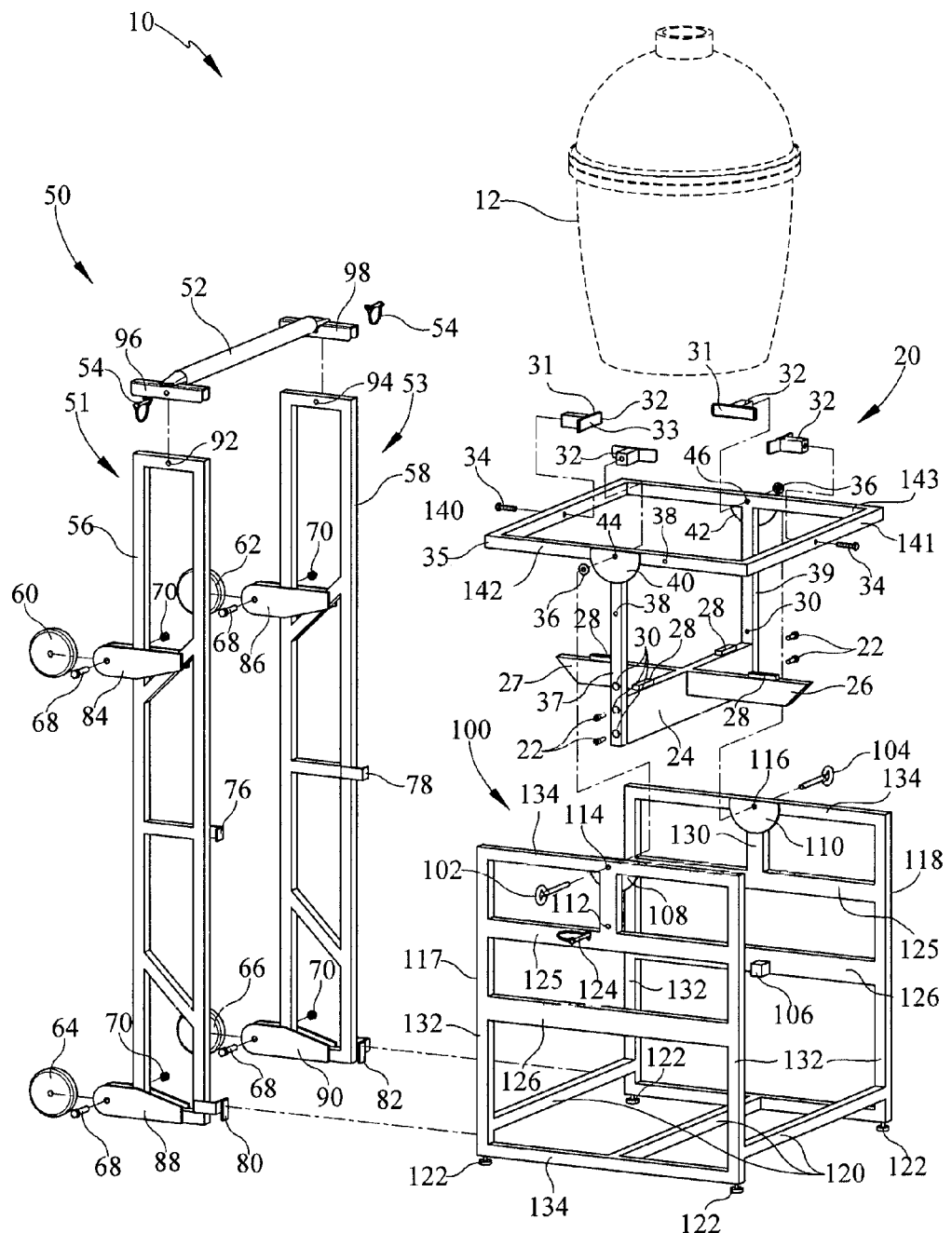
FIG. 8 is right front view of the disassembled parts of the ceramic cooker support frame and transporter.
Figure 9:
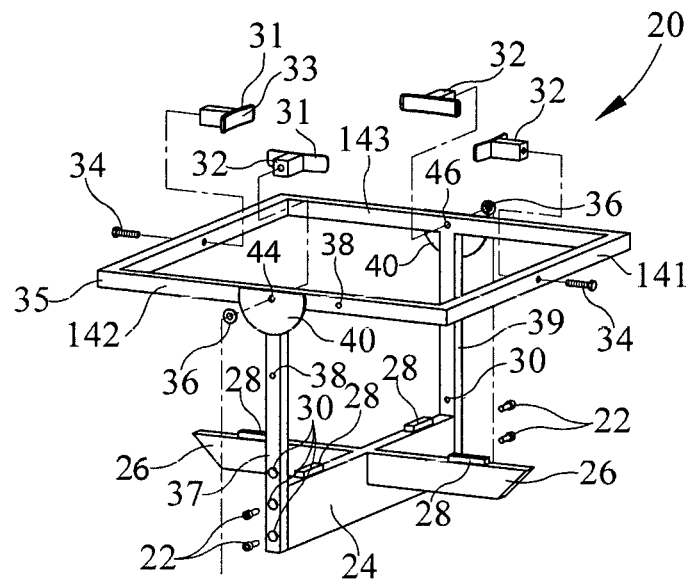
FIG. 9 is a perspective view of the ceramic cooker support frame pivotal basket for support within the cooker frame or cage.
Figure 10:
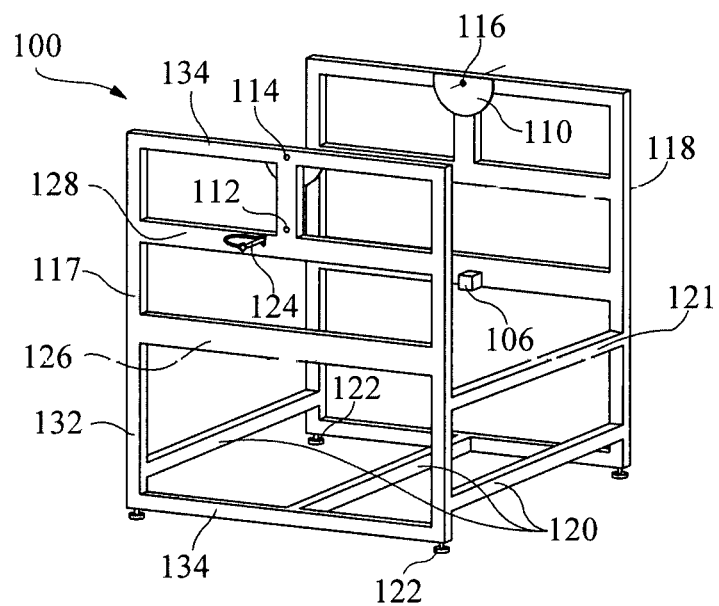
FIG. 10 is a perspective view of the ceramic cooker support frame for supporting the pivotal basket.
Figure 11:
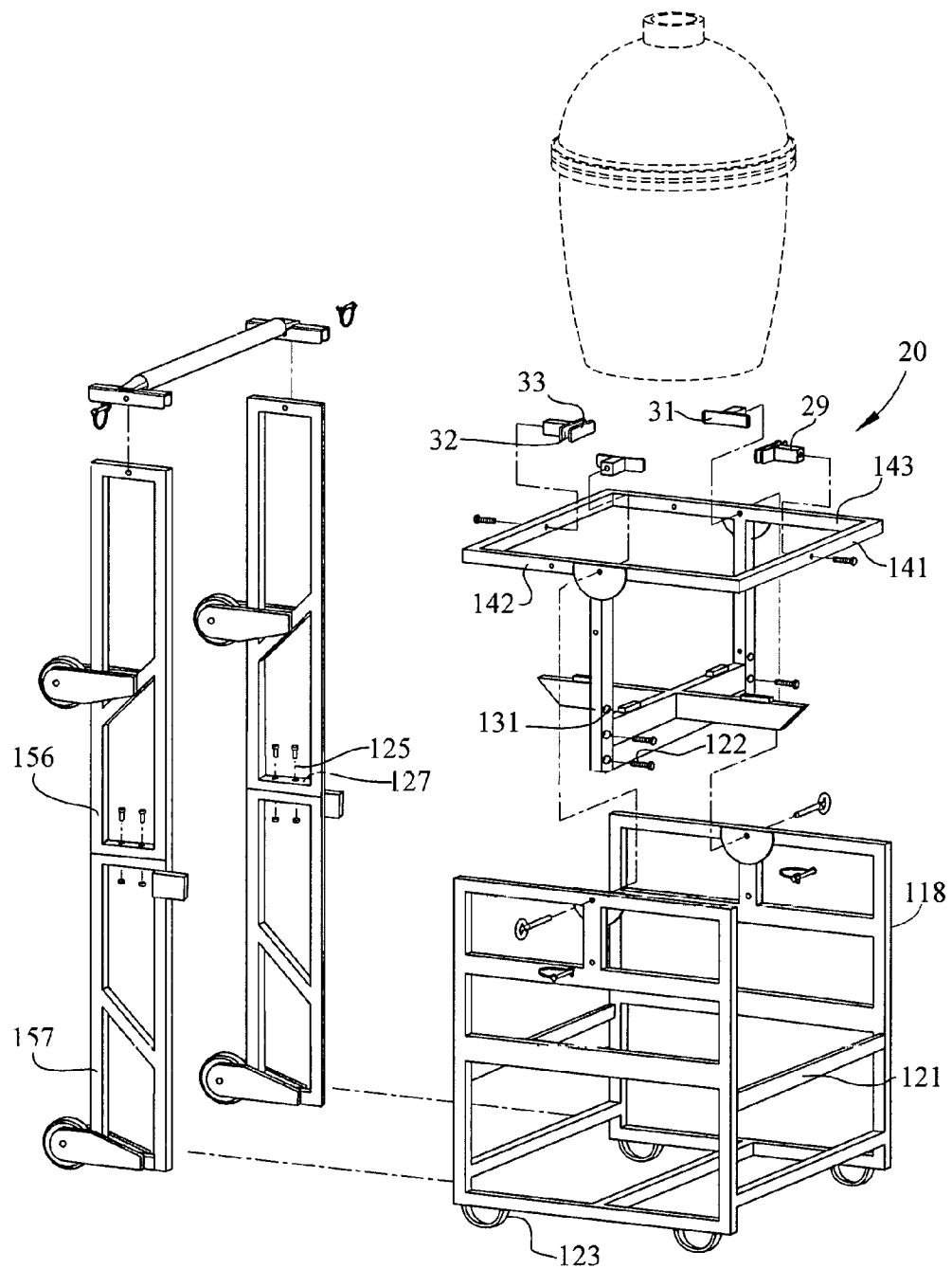
FIG. 11 is a perspective exploded view of the ceramic cooker support frame pivotal basket supporting a ceramic cooker shown in broken lines held within the cooker support frame or cage for cooperative engagement with a truck frame with an upper half and a lower half which are detachable from one another.

As best seen in FIG. 8, the cooker holding frame or cage 100 is a generally square structural frame including a vertical right side frame 117 and a vertical left side frame 118 connected parallel to one another and spaced apart by three parallel horizontal connecting bars 120 near the bottom of side frames 117 and 118. Each of side frames 117 and 118 comprise an exterior rectangular frame with the short top longitudinal horizontal members 133 at the top and bottom and two long longitudinal vertical members 132, one on each side. Each side frame 117 and 118 includes a horizontal cross brace 126 connecting the centers of the two vertical members 132 and another horizontal cross brace 128 centered between cross brace 126 and the top horizontal member 133. A vertical longitudinal member 130 connects the horizontal cross member 128 to the top horizontal member 133 at the center. The top horizontal members 133 of each side frame 117 and 118 include horizontal through holes 114 and 116, respectively, centered on and perpendicular to the long axis of the top horizontal members 133, for receiving pivot pins 102 which support the cooker holding basket 20 and the cooker. Two approximately 210° sector plates 108 and 110 (that is, a plate just larger than a half moon) are centered at the through hole 114 and 116 and located on the inner surface of both sides 117 and 118 with the flat side of the sector facing upwards, to provide smoother movement of the cooker holding basket 20. Cross members 128 and vertical members 130 provide extra vertical support to top horizontal members 133, which support the weight of the cooker and the basket 20 through pivot pins 102.

Figure 7:
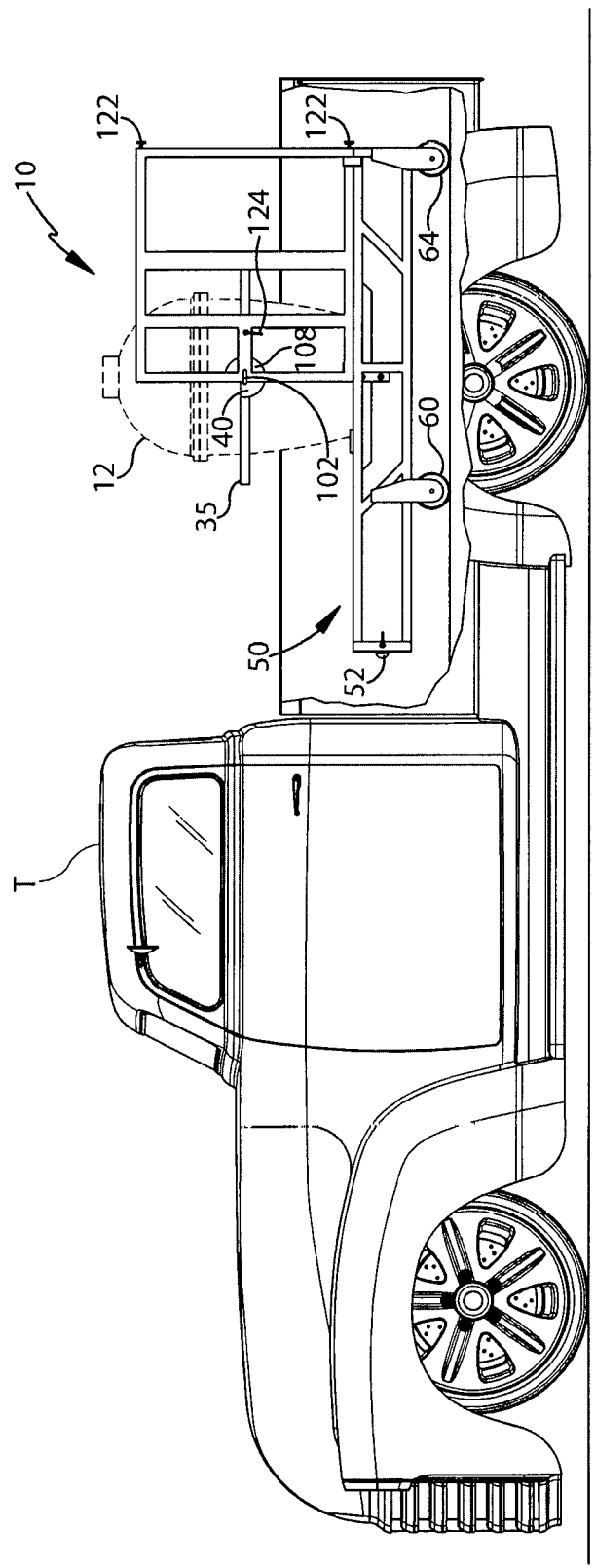
FIG. 7 is a right side view of the ceramic cooker support frame and transport device loaded into the elevated bed of the pickup truck.

The horizontal cross member 128 of right side member 117 includes a horizontal through hole 112 which is perpendicular to the long axis of cross member 128 and, when in alignment with one of the two through holes 38 in the cooker basket 20, receives a basket locking pin 124 which prevents the basket 20 from pivoting when the frame members 117 and 118 are upright as in FIGS. 1-4 or lying down as in FIG. 7. A stop block 106 at a selected position on the right surface of the horizontal cross member 126 of left side member 118 limits the pivoting motion of the cooker and basket 20 when the cooker holding frame 100 is in motion and may be pivoting. Four adjustable feet 122 extend downward from the ends of the bottom horizontal members 134 for the purpose of leveling the cooker frame 100 on a horizontal solid surface.

The cooker holding basket 20, best shown in FIGS. 2, 5, 6, and 8, includes an open horizontal square member 35 made of four horizontal longitudinal members 140-143, a vertical longitudinal member 37 extending downward from the center point of horizontal member 142, a vertical longitudinal member 39 extending downward from the center point of horizontal member 143 and a horizontal longitudinal member 24 extending from the lower end of vertical longitudinal member 37 to the lower end of vertical longitudinal member 39. The horizontal member 24 weighs in the range of five to thirty pounds and serves as a counter balance to maintain the basket 20 in a position with the open square member facing upwards and therefore, the cooker is maintained in an upright position as well. Without a counter balance, the cooker may swing uncontrollably and flip sideways or even upside down within the frame. Therefore, the selection of the weight and the position of the distance from the tope of member 24 and the pivot holes 46 and 48 is critical. Horizontal members 142 and 143 contain horizontal through holes 44 and 46 respectively, which are centered in and perpendicular to the length of the members 142 and 143. The through holes 44, 46, 114 and 116 are located at the center of the long axis of the longitudinal members in which they are contained.

As with the through holes 114 and 116 above, two approximately 210° sector plates 40 and 42 (that is, a plate just larger than a half moon) are centered at the through holes 44 and 46 respectively and located on the outer face of members 142 and 143 respectively. When the through hole pairs 114-44 and 116-46 are aligned and eye bolts 102 and 104 are inserted one in each pair of through holes, the outer surfaces of plates 40 and 42 are adjacent to the inner surfaces of plates 108 and 110. When the basket 20 is pivoting within the cooker holding frame 100, the two pairs of plates will provide for smooth pivoting.

A horizontal cross member 26 extends forward from the center point of horizontal member 24. A horizontal cross member 27 extends rearward from the center point of horizontal member 24. The two horizontal cross members 26 and 27 are about the same length as one half of the width of the bottom of the cooker. The top surfaces of the horizontal cross members 26 and 27 and the horizontal cooker supporting member 24 are coplanar and have resilient protective pads 28 applied to the top surfaces thereof. The bottom of the cooker rests on the four pads 28. Four brackets extend horizontally inward from the center points of the four horizontal members 140-143. Each bracket 32 includes an inward facing arcuate member 31 which matches the curvature of the outer surface of the cooker. The inner surface of the arcuate members are covered with resilient protective pads 33. Thus the cooker is supported from the bottom by horizontal members 24, 26 and 27 covered with pads 28 and is held laterally in place by the four arcuate members 31 covered with resilient pads 33.

Different sized brackets 32 with differing curvatures on the arcuate members are available for larger cookers or smaller cooker. For instance, a smaller cooker would require a bracket 32 with longer horizontal members to reach in to the cooker and arcuate members 31 with a sharper curvature.

An optional fourth bar connecting bar 121 is parallel to connecting bars 120 located toward the front side of the frames 117 and 118 at a height just below the crossbar 26 so that the cooker supporting member can swivel without crossbar 26 touching the fourth connecting bar 121.

The length of the brackets 32 and the curvature of the arcuate pieces 31 are selected so that the frame can receive a cooker of a given size.

The two downward extending members 37 and 39 have at least three spaced apart through holes 30 pointing radially inward for inserting two bolts in two of the three holes and threading into the ends of horizontal member 24. Only two of the three holes 30 can be used. The extra holes provide for alternate vertical positioning of the cooker within the basket 20.

The hand truck 50 includes a left side truck frame assembly 53, a right side truck frame assembly 51 and a handle unit 55. The handle unit 55 includes a horizontal handle bar 52 with a horizontal downward opening channel member 96 attached perpendicularly to the right hand end of handle bar 52 and a horizontal downward opening channel member 98 attached perpendicularly to the left hand end of handle bar 52. The downward opening channel members 96 and 98 receive and hold the top edges of the left and right side truck frame assemblies 53 and 51 in a fixed relationship to one another. Horizontal through holes 92 and 94 in the top members of the left and right side truck frame assemblies 53 and 51 and horizontal through holes centered in the channel members 96 and 98 are aligned and locking pins 54 are inserted to lock the two side truck frame assemblies together in the channel members 96 and 98 of the handle unit 55.

The left and right side truck frame assemblies 53 and 51 are generally rectangular frames where-in the left and right side truck frame assemblies 53 and 51 are about four to ten inches in width and the height of the left and right side truck frame assemblies is about twice the height of the side frames 117 and 118 of the cooker holding frame. The left side frame assembly 53 includes two parallel lower wheel flanges 88 extending horizontally rearward from each side of the bottom of the left side frame assembly 53. A castor wheel 64 is aligned with through holes in the flanges 88 and a shoulder bolt 68 is passed through the through holes and the castor wheel 64 and threaded into a fastening nut. The left side frame assembly 53 also includes two parallel upper wheel flanges 84 extending horizontally rearward from each side of the left side frame assembly 53 at a height of about three quarters of the height of the frame assembly 53. A castor wheel 60 is aligned with through holes in the flanges 84 and a shoulder bolt 68 is passed through the through holes and the castor wheel 60 and threaded into a fastening nut.

The right side frame assembly 51 includes two parallel lower wheel flanges 90 extending horizontally rearward from each side of the bottom of the right side frame assembly 51. A castor wheel 66 is aligned with through holes in the flanges 90 and a shoulder bolt 68 is passed through the through holes and the castor wheel 66 and threaded into a fastening nut. The right side frame assembly 51 also includes two parallel upper wheel flanges 86 extending horizontally rearward from each side of the right side frame assembly 51 at a height of about three quarters of the height of the frame assembly 51. A castor wheel 62 is aligned with through holes in the flanges 86 and a shoulder bolt 68 is passed through the through holes and the castor wheel 62 and threaded into a fastening nut.

The left side frame assembly 53 includes a lower L-shaped clip 82 rigidly fixed on the outer face of the left side frame assembly 53 near the bottom with the opening of the clip facing to the right and the free end of the L-shaped clip having a downward extending portion. The clip 82 is sized to receive and tightly hold the bottom portion of the rear vertical longitudinal member 132 on vertical left side frame 118 just above the bottom horizontal longitudinal member 134 with the downward extending portion bearing against the inner side of the bottom horizontal longitudinal member 134.

The left side frame assembly 53 also includes an upper L-shaped clip 78 rigidly fixed on the inner face of the left side frame assembly 53 with the opening of the clip facing to the left. The clip 78 is located at a distance above the clip 82 such that when the lower clip 82 is locked in place just above the bottom horizontal member 134, the clip 78 catches and holds the top portion of the rear vertical longitudinal member 132 on the vertical left side frame 118 just below the top horizontal longitudinal member 133.

The right side frame assembly 51 includes a lower L-shaped clip 80 rigidly fixed on the outer face of the right side frame assembly 51 near the bottom with the opening of the clip facing to the left and the free end of the L-shaped clip having a downward extending portion. The clip 80 is sized to receive and tightly hold the bottom portion of the rear vertical longitudinal member 132 on vertical right side frame 117 just above the bottom horizontal longitudinal member 134 with the downward extending portion bearing against the inner side of the bottom horizontal longitudinal member 134.

The right side frame assembly 51 also includes an upper L-shaped clip 76 rigidly fixed on the inner face of the right side frame assembly 51 with the opening of the clip facing to the right. The clip 76 is located at a distance above the clip 80 such that when the lower clip 80 is locked in place, the clip 76 catches and holds the top portion of the rear vertical longitudinal member 132 on the vertical right side frame 118 just below the top horizontal longitudinal member 133.

With the left and right side frame truck assemblies 51 and 53 attached by the clips as explained above, the channels 96 and 98 of the handle unit 55 are positioned over the top horizontal members of the left and right side frame assemblies 56 and 58, respectively so that the through holes 92 and 94 are aligned with the through holes in the top horizontal members. Lock pins 54 are placed in the aligned through holes to lock the handle unit 55 in place and thus hold the left and right side frame truck assemblies 51 and 53 in a parallel spaced apart relationship with one another. Thus, the clips 76, 78, 80, and 82 and the handle unit 55 maintain the hand truck 50 in rigid connection with the ceramic support frame 100.

Another alternate embodiment of the cooker frame and transport device, shown in FIGS. 9-12, has left and right truck frame assemblies which have and upper half 152 and a lower half 154 which are detachable from one another to allow the lower portions 154 to remain attached to the cooker support frame while the upper half 152 is removed for appearance and convenience. The screw 158 and nuts 156 are removed to allow disassembly of the upper halves 152 from the lower halves 154.

Still another alternate embodiment of the cooker frame and transport device includes sliders 150, as seen in FIG. 13, instead of caster wheels 60 at the upper end of the left and right side frame truck assemblies 51 and 53. As the truck assemblies are angled over onto a platform such as a pickup bed shown in FIGS. 6 and 7, the sliders 150 come into contact with the upper surface of the platform and slide forward into the truck.

Yet another alternate embodiment of the cooker frame and transport device has a simpler pair of left and right side frame truck assemblies 160 with one vertical longitudinal element 160 and braced wheel units 167 and 168, as shown in FIG. 14.

Figure 12:
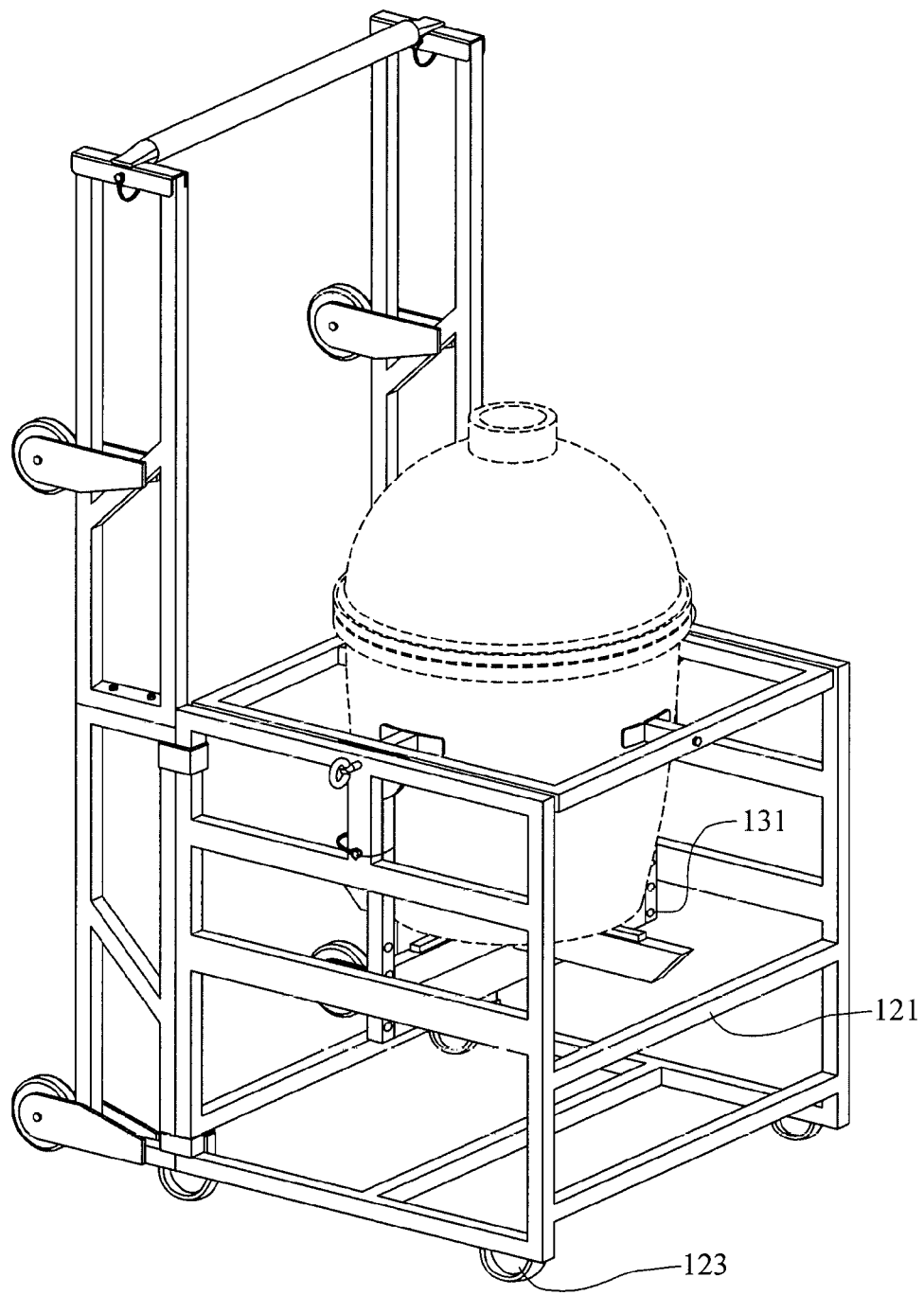
FIG. 12 is a perspective view of the ceramic cooker support frame pivotal basket supporting a ceramic cooker shown in broken lines held within the cooker support frame or cage for cooperative engagement with a truck frame with an upper half and a lower half which are detachable from one another.

An alternate embodiment of the cooker frame and transport device contains left and right side panels 166, as shown in FIG. 12, rather than side frame assemblies 117 and 118. Panels 166 are solid resilient material which are about one eighth to one quarter inches in thickness and spaced apart and held together in a parallel configuration by horizontal parallel crossbars 120 and 121.

The cooker frame and transport device can also have lugs 164 extending downward from the front and rear end of the cooker support frames rather than leveling legs 122.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A pivotal support frame and transport device for a cooker, grill, or smoker, comprising:
   a hand truck comprising a first side frame and a second side frame spaced apart, aligned, and parallel to one another, said first side frame and said second side frame including at least one bottom wheel extending rearward and perpendicular from said first side frame and at least one bottom wheel extending rearwared and perpendicular from said second side frame and a support base member spaced apart from said at least one bottom wheel for contacting an elevated surface when the hand truck is positioned at an angle with respect to the ground and said elevated surface, a cross member connecting said first side frame to said second side frame defining a handle there between, and means for removably attaching a front surface of said first side frame and said second side frame to a cooker holding frame;
   said cooker holding frame comprising a generally square structural frame including a vertical right side frame and a vertical left side frame connected parallel to one another and spaced apart by at least one horizontal connecting bar, said right side frame and said left side frame having an open perimeter, and a pivotal basket for holding and supporting a cooker therein;
   said pivotal basket including a basket frame extending around said cooker, said basket frame pivotally mounting within said cooker holding frame, said basket including a weighted member extending from a lower end of said basket, said basket frame including a plurality of brackets extending therefrom inwardly at selected positions for holding said cooker there between, said weighted member pivoting said pivotal basket holding said pivotal basket in an up-right position with respect to said cooker frame when said cooker frame is connected to said hand truck and tilted at an angle for loading or unloading from an elevated surface.

2. The pivotal support frame and transport device for a cooker, grill or smoker of claim 1, said support base member comprising a caster.

3. The pivotal support frame and transport device for a cooker, grill or smoker of claim 1, said support base member comprising a skid.

4. A pivotal support frame and transport device for a cooker, grill, or smoker comprising:
   a cooker holding frame comprising a right side frame connecting to an opposing left side frame by at least one rear longitudinal member and at least one front longitudinal frame member, said cooker holding frame including holding frame means for pivotally mounting of a self leveling cooker holding basket assembly supported by said right side frame and said left side frame;
   said cooker holding basket assembly comprising a peripheral basket frame for surrounding a cooker, said peripheral basket frame including pivotal connections for cooperatively engaging said holding frame means for mounting, a basket base for supporting a cooker thereon, said basket base hanging from at least two basket support members extending downward from said peripheral basket frame, said peripheral basket frame including a counterweight mounting to said basket base, and a plurality of brackets extending inwardly from said peripheral basket frame for holding said cooker spaced apart from said peripheral basket frame;

a dolly in cooperative engagement and removably attachable to said cooker holding frame, said dolly comprising a left longitudinal dolly frame member and a right longitudinal dolly frame member spaced apart from and in alignment and parallel with one another, said left longitudinal dolly frame member and said right longitudinal dolly frame member including a bottom rear roller mounting means with a bottom roller extending outwardly therefrom, said left longitudinal dolly frame member and said right longitudinal dolly frame member including a medial rear roller mounting means with a medial roller extending outwardly therefrom;

a left medial holding means for removably attaching a front medial edge of said left longitudinal dolly frame member with a rear medial edge of said left side frame, a right medial holding means for removably attaching a front medial edge of said right longitudinal dolly frame member with a rear medial edge of said right side frame, a left bottom holding means for removably attaching a front bottom edge of said left longitudinal dolly frame member with a rear bottom edge of said left side frame, and a right bottom holding means for removably attaching a front bottom edge of said right longitudinal dolly frame member with a rear bottom edge of said right side frame; and a handle comprising a horizontal bar extending between said left longitudinal dolly frame member and said right longitudinal dolly frame member.

5. The pivotal support frame and transport device for a cooker, grill or smoker of claim 4, a resilient protective pad applied a top surface of said basket base.

6. The pivotal support frame and transport device for a cooker, grill or smoker of claim 4, wherein each one of said plurality of brackets extending inwardly from said peripheral basket frame includes an inward facing arcuate member.

7. The pivotal support frame and transport device for a cooker, grill or smoker of claim 6, wherein said inward facing arcuate member include an inner surface covered with a resilient protective pad.

8. The pivotal support frame and transport device for a cooker, grill or smoker of claim 4, wherein said left longitudinal dolly frame member and said right longitudinal dolly frame member each comprise a rectangular frame having a pair of spaced apart longitudinal members joined together by a top bar and a bottom bar.

9. The pivotal support frame and transport device for a cooker, grill or smoker of claim 4, wherein said holding frame means for pivotally mounting of a self leveling cooker holding basket supported by said right side frame and said left side frame comprises a pair of sector plates located on an inner surface of said holding frame.

10. The pivotal support frame and transport device for a cooker, grill or smoker of claim 4, including a locking pin for immovably holding said peripheral holding basket in a stationary position within said cooker holding frame.

11. The pivotal support frame and transport device for a cooker, grill or smoker of claim 4, including a stop block at a selected position mounted to said cooker holding frame for limiting pivoting motion of said cooker and said peripheral holding basket.

12. The pivotal support frame and transport device for a cooker, grill or smoker of claim 4, wherein said left medial holding means for removably attaching said front medial edge of said left longitudinal dolly frame member with said rear medial edge of said left side frame comprises a clip, said right medial holding means for removably attaching said front medial edge of said right longitudinal dolly frame member with said rear medial edge of said right side frame comprises a clip, said left bottom holding means for removably attaching said front bottom edge of said left longitudinal dolly frame member with said rear bottom edge of said left side frame comprises a clip, and said right bottom holding means for removably attaching said front bottom edge of said right longitudinal dolly frame member with said rear bottom edge of said right side frame comprises a clip.

13. The pivotal support frame and transport device for a cooker, grill or smoker of claim 4, wherein said cooker is a ceramic cooker.

14. A pivotal support frame and transport device for a cooker, grill, or smoker, comprising:

a cooker holding frame comprising a right side frame connecting to an opposing left side frame by at least one rear longitudinal member and at least one front longitudinal frame member, said cooker holding frame including holding frame means for pivotally mounting of a self leveling cooker holding basket assembly supported by said right side frame and said left side frame;

said cooker holding basket assembly comprising a peripheral basket frame for surrounding a cooker, said peripheral basket frame including pivotal connections for cooperatively engaging said holding frame means for mounting, a basket base for supporting a cooker thereon, said basket base hanging from at least two basket support members extending downward from said peripheral basket frame, said peripheral basket frame including a counterweight mounting to said basket base, and a plurality of brackets extending inwardly from said peripheral basket frame for holding said cooker spaced apart from said peripheral basket frame;

a dolly in cooperative engagement and removably attachable to said cooker holding frame, said dolly comprising a left longitudinal dolly frame member and a right longitudinal dolly frame member spaced apart from and in alignment and parallel with one another, said left longitudinal dolly frame member and said right longitudinal dolly frame member including a bottom rear roller mounting means with a bottom roller extending outwardly therefrom, said left longitudinal dolly frame member and said right longitudinal dolly frame member including a medial rear roller mounting means with a medial roller extending outwardly therefrom;

a left medial clip for removably attaching a front medial edge of said left longitudinal dolly frame member with a rear medial edge of said left side frame, a right medial clip for removably attaching a front medial edge of said right longitudinal dolly frame member with a rear medial edge of said right side frame, a left bottom clip for removably attaching a front bottom edge of said left longitudinal dolly frame member with a rear bottom edge of said left side frame, and a right bottom clip for removably attaching a front bottom edge of said right longitudinal dolly frame member with a rear bottom edge of said right side frame; and a horizontal bar extending between said left longitudinal dolly frame member and said right longitudinal dolly frame member.

15. The cooker support frame and transport device of claim 14, a resilient protective pad applied a top surface of said basket base.

16. The cooker support frame and transport device of claim 14, wherein each one of said plurality of brackets extending inwardly from said peripheral basket frame includes an inward facing arcuate member.

17. The cooker support frame and transport device of claim 16, wherein said inward facing arcuate member include an inner surface covered with a resilient protective pad.

18. The cooker support frame and transport device of claim 14, wherein said left longitudinal dolly frame member and said right longitudinal dolly frame member each comprise a rectangular frame having a pair of spaced apart longitudinal members joined together by a top bar and a bottom bar.

19. The cooker support frame and transport device of claim 14, including a locking pin for immovably holding said peripheral holding basket in a stationary position within said cooker holding frame.

20. The cooker support frame and transport device of claim 14, including a stop block at a selected position mounted to said cooker holding frame for limiting pivoting motion of said cooker and said peripheral holding basket.

\* \* \* \* \*